US009382689B2

(12) United States Patent
Chapman et al.

(10) Patent No.: US 9,382,689 B2
(45) Date of Patent: Jul. 5, 2016

(54) STUMP DESTRUCTION APPARATUS

(75) Inventors: Richard T. Chapman, Beatrice, AL (US); John B. Newton, Beatrice, AL (US); Ronald D. Evers, Jr., Beatrice, AL (US)

(73) Assignee: Neway Development, Inc., Beatrice, AL (US)

( * ) Notice: Subject to any disclaimer, the term of this patent is extended or adjusted under 35 U.S.C. 154(b) by 1009 days.

(21) Appl. No.: 13/564,425

(22) Filed: Aug. 1, 2012

(65) Prior Publication Data
US 2013/0056113 A1 Mar. 7, 2013

Related U.S. Application Data

(60) Provisional application No. 61/514,080, filed on Aug. 2, 2011.

(51) Int. Cl.
*A01G 23/06* (2006.01)
*E02F 3/96* (2006.01)
*E02F 9/20* (2006.01)
*E02F 9/22* (2006.01)

(52) U.S. Cl.
CPC ............. *E02F 3/96* (2013.01); *A01G 23/067* (2013.01); *E02F 9/202* (2013.01); *E02F 9/2253* (2013.01)

(58) Field of Classification Search
CPC ............ A01G 23/067; B27L 7/02; B27L 7/04
See application file for complete search history.

(56) References Cited

U.S. PATENT DOCUMENTS

| 1,012,962 | A | 12/1911 | Anderson |
| 1,104,535 | A | 7/1914 | Moore |
| 1,114,505 | A | 10/1914 | Moore |
| 1,164,659 | A | 12/1915 | Moore |
| 1,417,425 | A | 5/1922 | Thompson |
| 1,504,963 | A | 8/1924 | McKoy et al. |
| 2,940,487 | A | 6/1960 | O'Neill et al. |
| 3,818,957 | A | 6/1974 | Schoonover |
| 4,637,442 | A | 1/1987 | Mozer |
| 4,697,625 | A | 10/1987 | Bolton |

(Continued)

FOREIGN PATENT DOCUMENTS

| EP | 2077069 A1 | 7/2009 |
| WO | WO 2011/053837 A1 | 5/2011 |

OTHER PUBLICATIONS

International Search Report and Written Opinion of the International Searching Authority for application No. PCT/US2012/049187.

*Primary Examiner* — Matthew G Katcoff
(74) *Attorney, Agent, or Firm* — Jeremy A. Smith; Jeffery Dyess; Bradley Arant Boult Cummings LLP

(57) ABSTRACT

The present disclosure provides an apparatus comprising a frame supporting a motor and a gearbox, and a bit assembly, the bit assembly comprising a shaft, having a first end and a second end, wherein the first end is attached to the gearbox via a gearbox output flange, a main bit assembly further comprising an upper cutting blade and a lower cutting blade attached to the shaft, wherein the lower cutting blade is located closer to the second end of the shaft than the upper cutting blade, an adjustable depth cutting guide attached to a bottom portion of the upper cutting blade, and a lateral cutting blade attached at the far end of the upper cutting blade and a guide bit assembly wherein the apparatus is attachable to a self-propelled vehicle.

9 Claims, 17 Drawing Sheets

(56) References Cited

U.S. PATENT DOCUMENTS

| | | | |
|---|---|---|---|
| 5,321,938 A * | 6/1994 | LeBlanc | A01D 34/661 56/14.7 |
| 5,360,041 A | 11/1994 | Stevens | |
| 6,546,977 B1 | 4/2003 | Monyak et al. | |
| 6,751,895 B2 | 6/2004 | Paumier | |
| 7,007,414 B2 | 3/2006 | Paumier | |
| 7,007,730 B2 | 3/2006 | Wildey | |
| 7,743,803 B2 | 6/2010 | Paumier | |
| 7,748,421 B2 | 7/2010 | Everett | |
| 2010/0319808 A1 | 12/2010 | Lawson | |
| 2011/0100508 A1 | 5/2011 | Fraley et al. | |

* cited by examiner

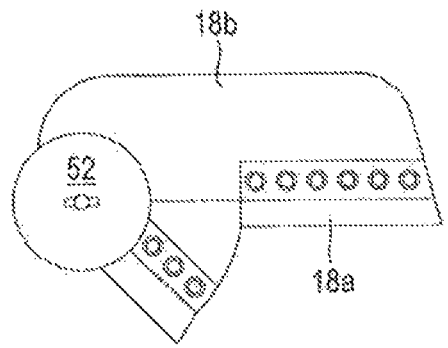
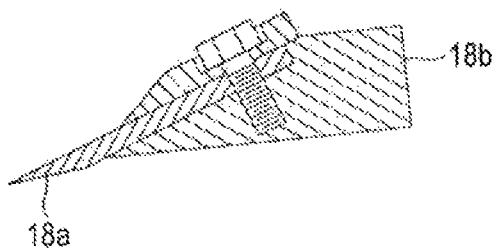
FIG. 21  FIG. 21A
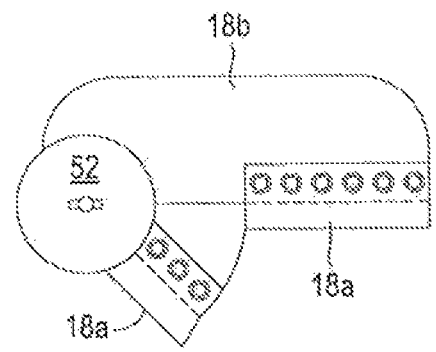
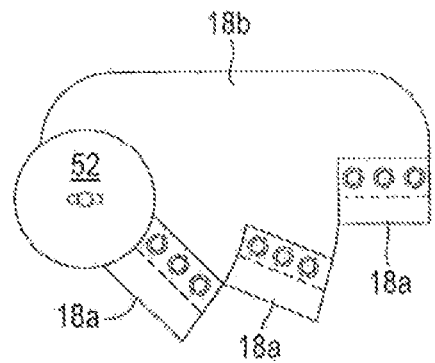
FIG. 22  FIG. 23
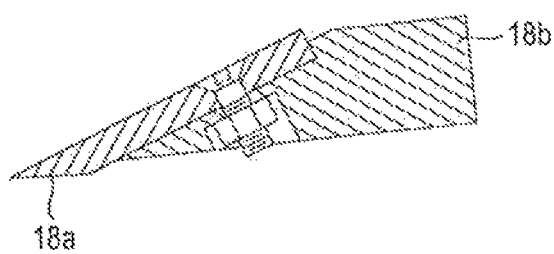
FIG. 23A

STUMP DESTRUCTION APPARATUS

CROSS-REFERENCE TO RELATED APPLICATIONS

This application claims priority to, and the benefit of, U.S. Provisional Application No. 61/514,080 filed Aug. 2, 2011 entitled "STUMP DESTRUCTION APPARATUS."

FIELD OF THE DISCLOSURE

In one aspect, the present disclosure pertains to the field of tree stump removal and destruction. More specifically, the present disclosure pertains to a stump destruction apparatus comprising a self-propelled vehicle 2 and a stump destruction device 4. In one embodiment, the stump destruction device 4 comprises a frame 6, a gearbox 8, a motor 10, a bit assembly 12.

In another aspect, the present disclosure pertains to a drive system 11 comprising a motor 10, gearbox 8 and coupling 9.

BACKGROUND

The destruction of unwanted stumps has been a major concern for property owners for years. For example, if a heavily timbered plot of land has been harvested, the property owner often desires to replant the plot with new saplings to harvest at a future time. Stumps remaining from the previously harvested timber can damage vehicles during the replanting process and compete with the newly planted trees for water and other nutrients. Alternatively, if a forested area is to be converted to farmland or developed for commercial/residential use, it is desirable to destroy all of the stumps from the fallen trees to allow for construction of roads or plow the field in preparation for planting crops. Previous methods and devices for removing or destroying stumps have either been laborious (i.e., digging the stump out by hand) or unreliable.

The present disclosure provides a stump destruction apparatus that meets many of the needs not addressed in the prior art and provides a more efficient, environmentally friendly, safer and novel stump destruction apparatus.

BRIEF DESCRIPTION OF THE DRAWINGS

FIG. 7A shows one embodiment of the coupling 9.

FIGS. 13-23A show top views of alternate embodiments of the cutting edges.

FIGS. 27 and 28 show alternate embodiments of cutting edges 25a.

DETAILED DESCRIPTION

Figure 1:
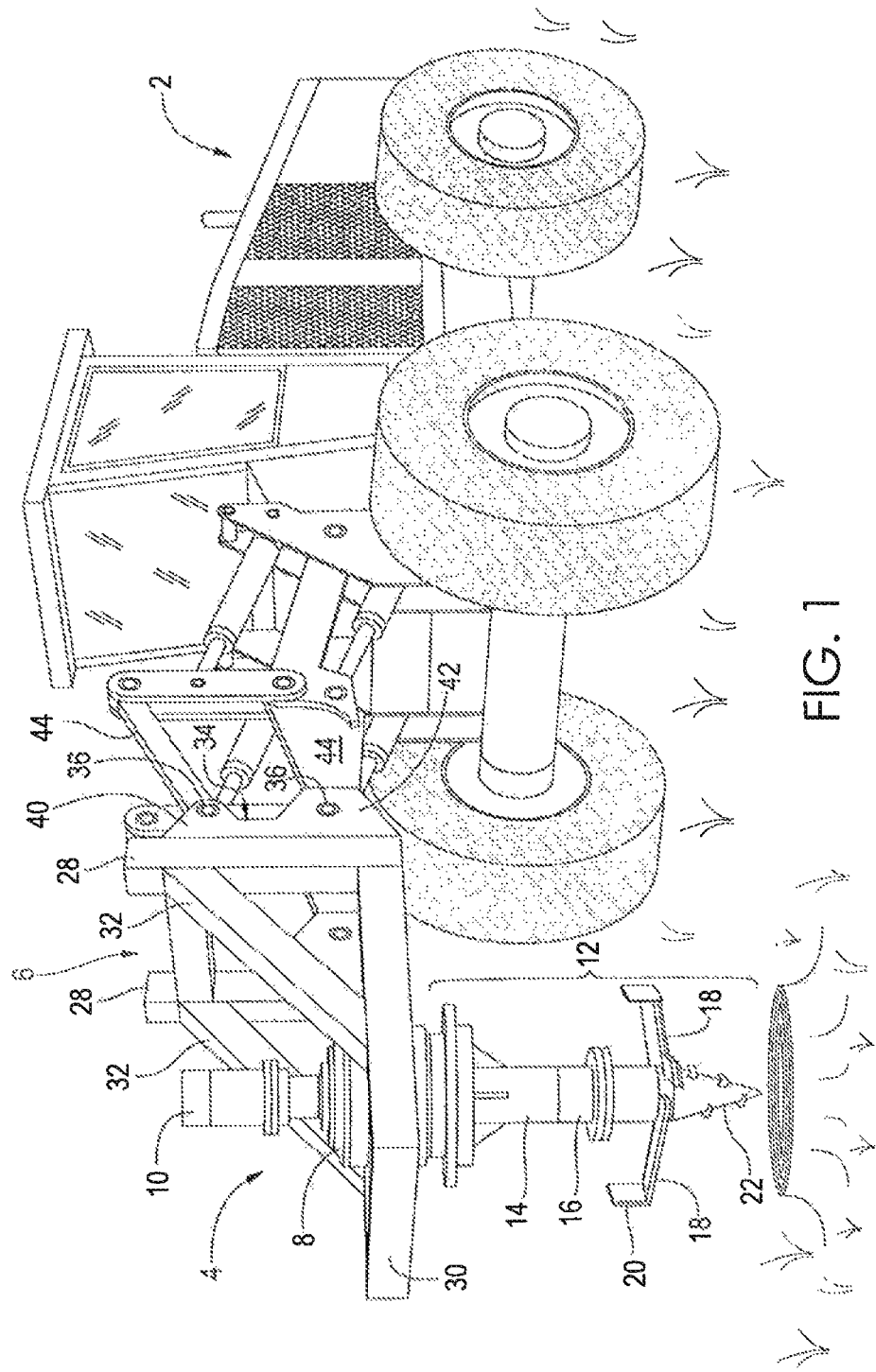
FIG. 1 shows one embodiment of the stump destruction apparatus disclosed herein.
Figure 2:
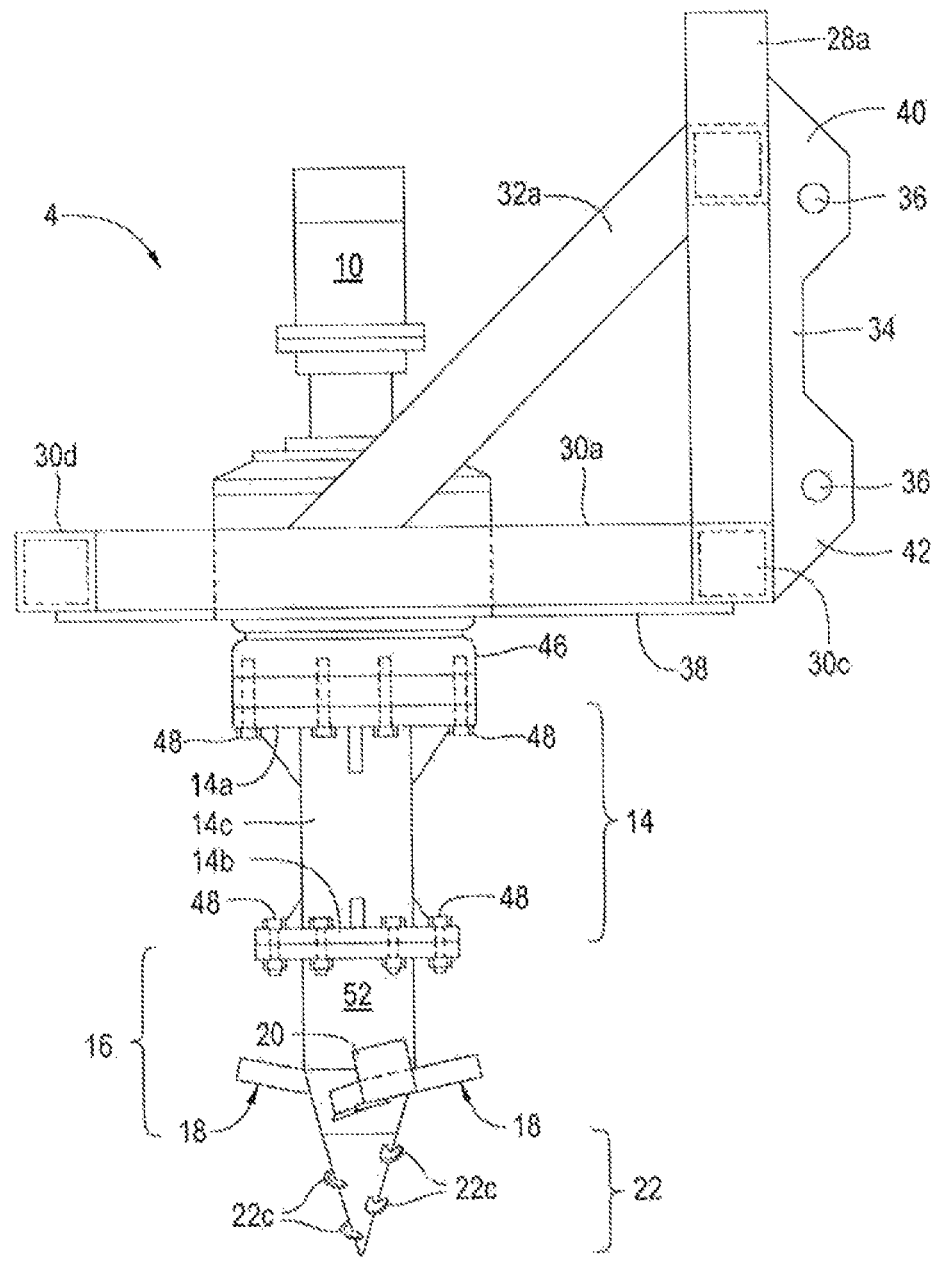
FIG. 2 shows a side view of one embodiment of the stump destruction device 4.
Figure 3:
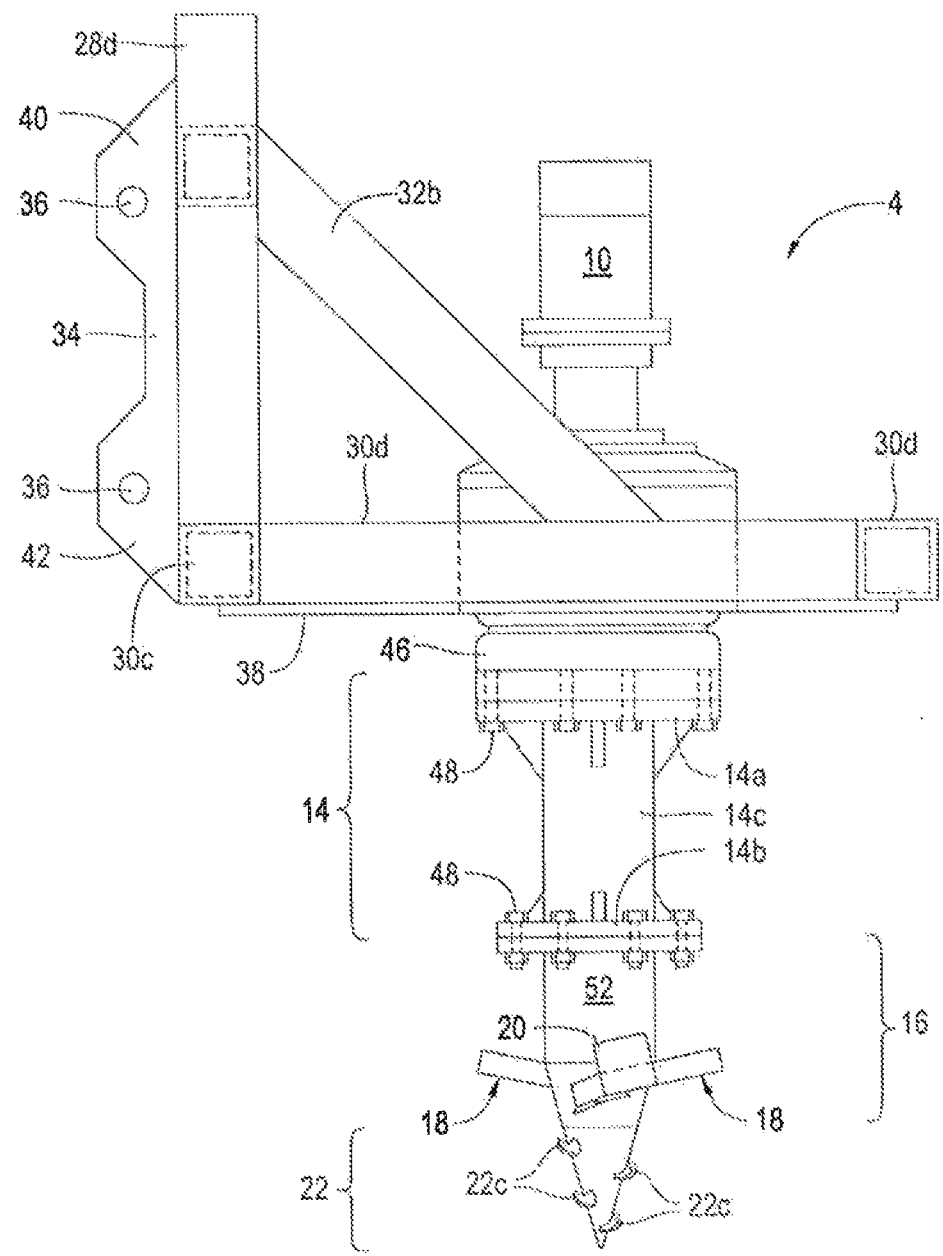
FIG. 3 shows an alternate side view of one embodiment of the stump destruction device 4.

Reference will now be made in detail to the various embodiments, including the preferred embodiment of the present invention, example of which is illustrated by and in the accompanying drawings.

The stump destruction apparatus provides a novel and useful device for the removal and destruction of stumps of a fallen or harvested tree. In one embodiment, as shown in FIGS. 1-24, a stump destruction apparatus is disclosed comprising a self-propelled vehicle 2 and a stump destruction device 4. In one embodiment, the self propelled vehicle 2 may be a "feller buncher," a skid steer loader, excavator or other suitable vehicle. In one embodiment, the self-propelled vehicle is a feller buncher. The self-propelled vehicle to which the stump destruction device 4 is attached may vary upon the environment and scale of the job-at-hand. For example, in large scale jobs when it is desirable to move quickly from stump-to-stump, yet minimize the environmental impact of operating the vehicle, a feller buncher can be desirable. In other embodiments, for example, in more urban settings where operating space is limited, it may be desirable to attach the stump destruction device 4 to a skid-steer loader.

In one embodiment, the stump destruction device 4 comprises a frame 6, a gear box 8, a motor 10 and a bit assembly 12.

Frame

As shown in FIGS. 1-6, in one embodiment the frame 6 comprises one or more vertical support members 28, one or more horizontal support members 30, one or more bracing members 32, an attachment mount 34 and a floor 38. The frame 6 is designed to provide the strength and support required by the stump destruction device 4 during transport and operation. The frame 6 may be modified, as one of ordinary skill in the art would recognize, depending upon the size of the stump destruction device 4. For example, the frame 6 used for a stump destruction device 4 attached to a feller buncher would most likely be larger than the frame used for a stump destruction device 4 attached to a skid-steer loader. In one embodiment, the frame 6 allows the stump destruction device to be removably attached to the self-propelled vehicle 2. In other embodiments, the frame 6 is adapted to permanently attach to the self-propelled vehicle.

The attachment mount 34 provides one or more receiving elements 36 that provide attachment points for attaching the stump destruction apparatus 4 to the self-propelled vehicle 2. In one embodiment, the attachment mount 34 comprises one or more substantially identical upper attachment supports 40 located horizontally opposite one another and attached to the upper portion of the one or more vertical support members 28. The upper attachment supports 40 comprise opposite plates 40a that each comprise one or more receiving elements 36 and form an opening or channel 40b that is adapted to receive a support arm/connection arm 44 from the self-propelled vehicle 2. In one embodiment, the attachment mount 34 further comprises substantially identical lower attachment supports 42 that attach to the one or more vertical support members 28 below the upper attachment supports 40. The lower attachment supports 42 comprise opposite plates 42a that each comprise one or more receiving elements 36 and form an opening or channel 42b that is adapted to receive a support arm/connection arm 44 from the self propelled vehicle 2. The attachment mount 34 and upper and lower attachment supports 42, 44 may need to be adapted slightly to the design of the self-propelled vehicle 2.

In an alternate embodiment, the frame 6 and attachment mount 34 can be adapted to be of a quick-release design that allows for the quick connection and/or disconnection of the stump destruction device 4 to the self propelled vehicle.

Figure 4:
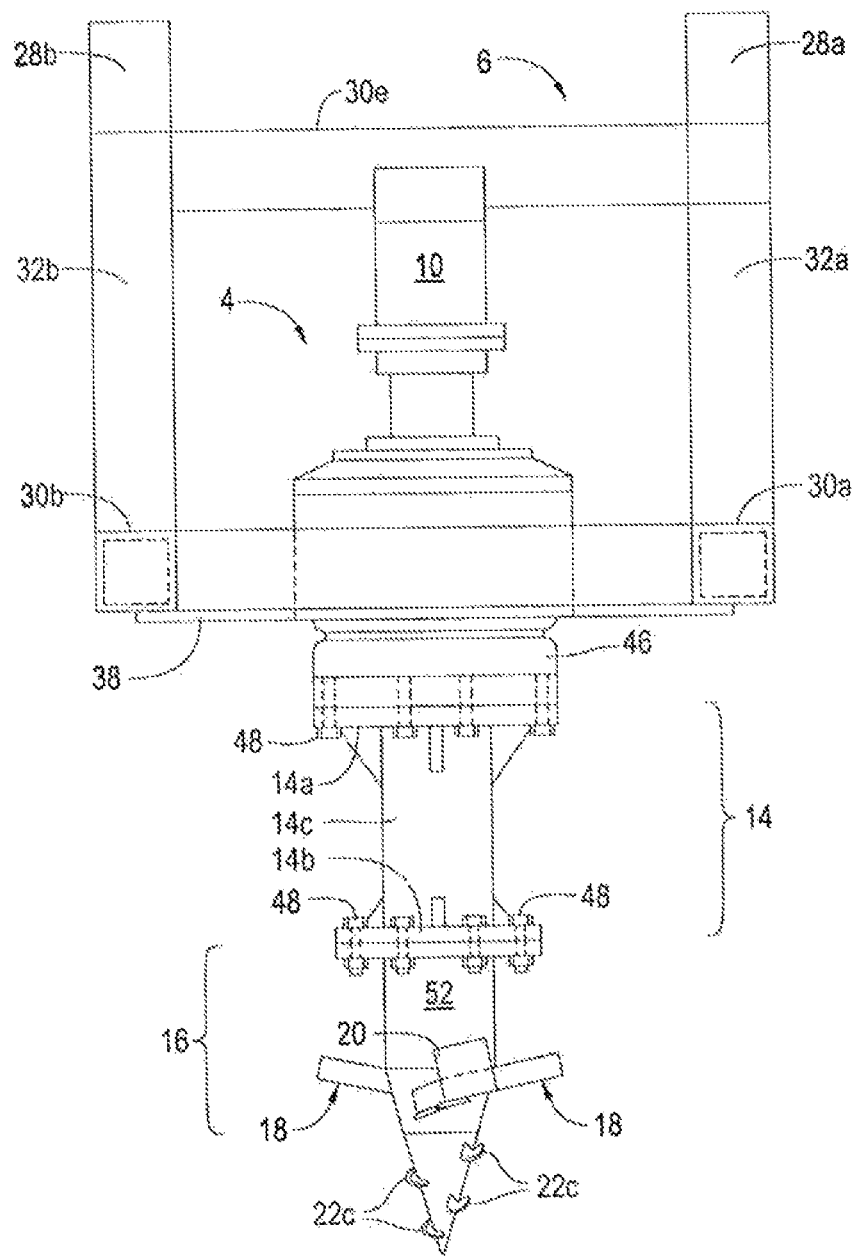
FIG. 4 shows a front view of one embodiment of the stump destruction device 4.
Figure 5:
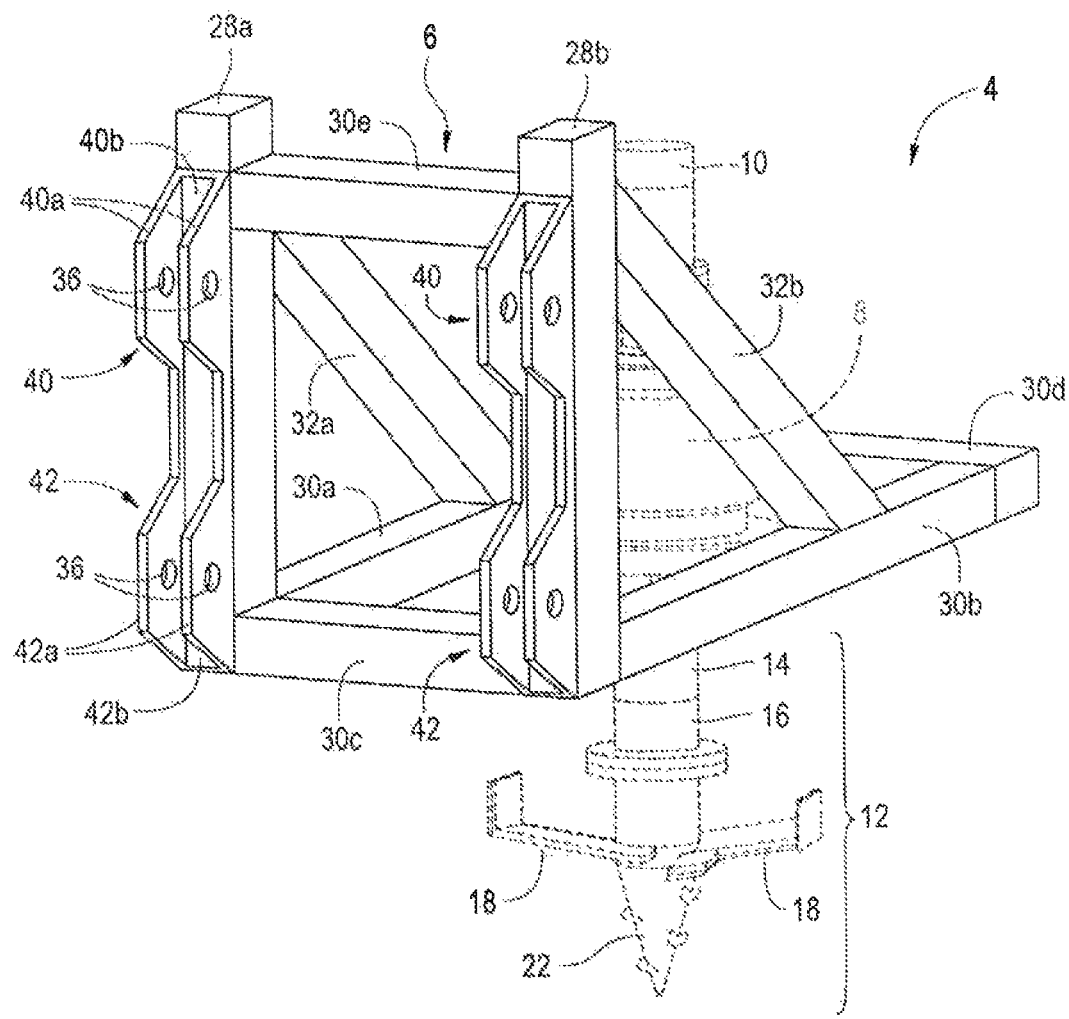
FIG. 5 shows a rear view of one embodiment of the stump destruction device 4.

The one or more vertical support members 28, one or more horizontal support members 30, one or more bracing members 32 and floor 38 generally provide a suitable frame to support the gear box 8, motor 10 and bit assembly 12 (as described in greater detail below). In one embodiment and as shown in FIGS. 1-5, the frame is constructed as follows: (a) the one or more vertical support members 28 are located opposite one another as shown by vertical support members 28a and 28b; (b) one or more horizontal support members 30a and 30b attach to a first side of the vertical support members 28a and 28b at substantially a ninety (90) degree angle; (c) horizontal support members 30e, 30d are attached to a second side of the one or more vertical support members 28a and 28b below horizontal support member 30d which is also attached to the second side of the one or more vertical support members 28a and 28b; (d) horizontal support member 30e is attached to horizontal support members 30a, 30b opposite the vertical support members 28a, 28b; (e) one or more bracing members 32a, 32b are attached to vertical support members 28a, 28b and horizontal support members 30a and 30b respectively and (f) the floor 38 is attached to the substantially rectangular shape formed by the combination of horizontal support members 30a, 30b, 30c and 30d. In one embodiment, the frame 6 comprises an additional horizontal support member 30e as shown in FIG. 4.

In one embodiment, the one or more bracing members 32a, 32b attach to the vertical supports members 28a, 28b and horizontal support members 30a and 30b at approximately a forty-five (45) degree angle.

The elements of the frame 6, including the one or more horizontal support members 30, the one or more vertical support member 28 and the one or more bracing member 32 may be fastened together by any means known in the art. In one embodiment, the frame 6 elements are welded together.

In one embodiment, the stump destruction apparatus and self-propelled vehicle 2 are coupled together through a plurality of pins (not shown) that pass through the receiving elements 36 on the upper and lower attachment supports 40, 42 and the support arm/connection arm of the self propelled vehicle.

The frame 6 allows the stump destruction device 4 to be manipulated by the self-propelled vehicle 2. In one embodiment, the self-propelled vehicle comprises a series of hydraulic cylinders that attach to the frame 6 directly or to the upper and lower attachment supports 42, 44. The hydraulic cylinder allows an operator to manipulate the stump destruction device 4 in the x, y and z dimensions as needed to safely and effectively destroy the object stump.

Motor

Figure 6:
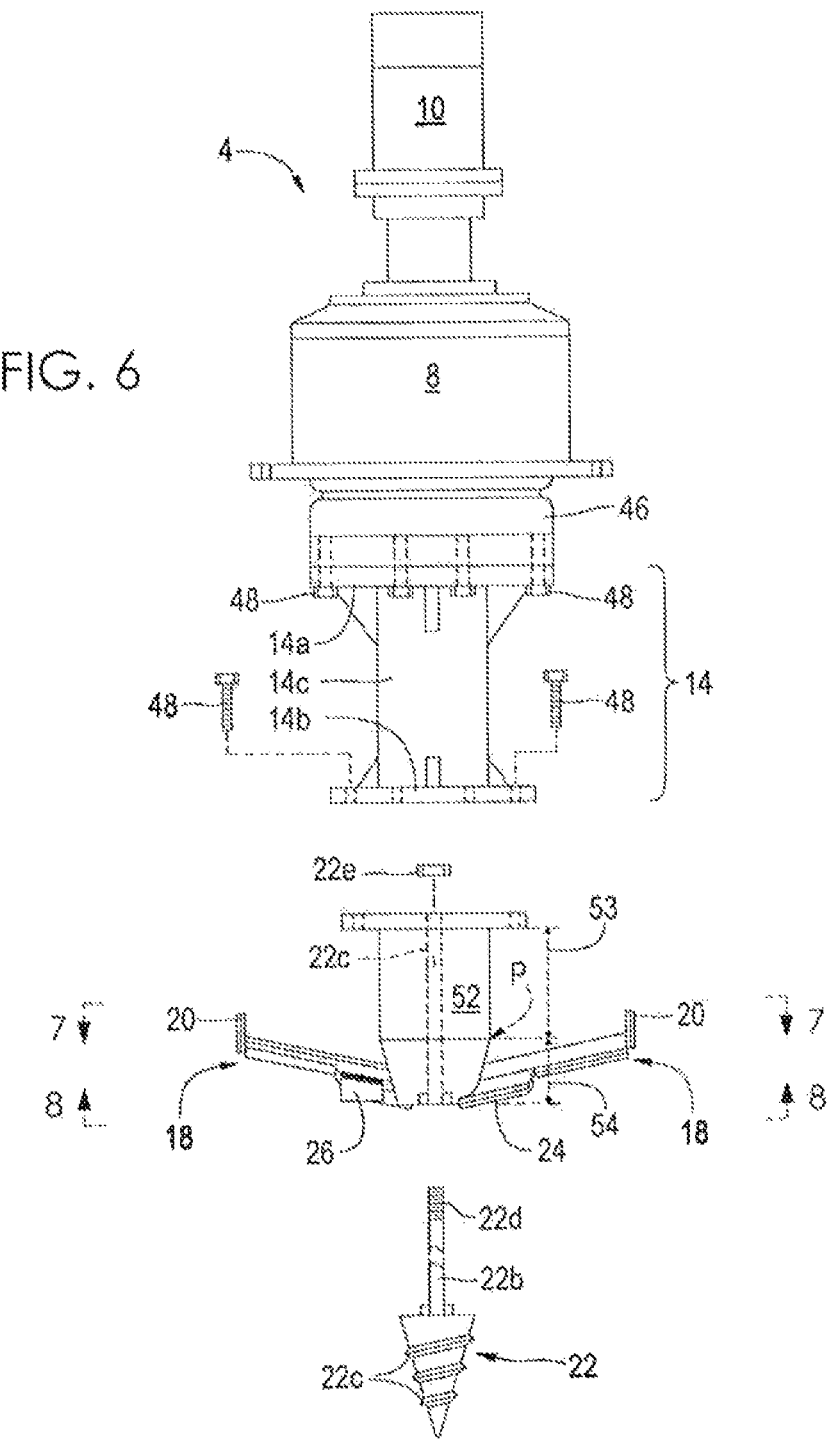
FIG. 6 shows an exploded view of the stump destruction device 4 without the frame 6.
Figure 7:
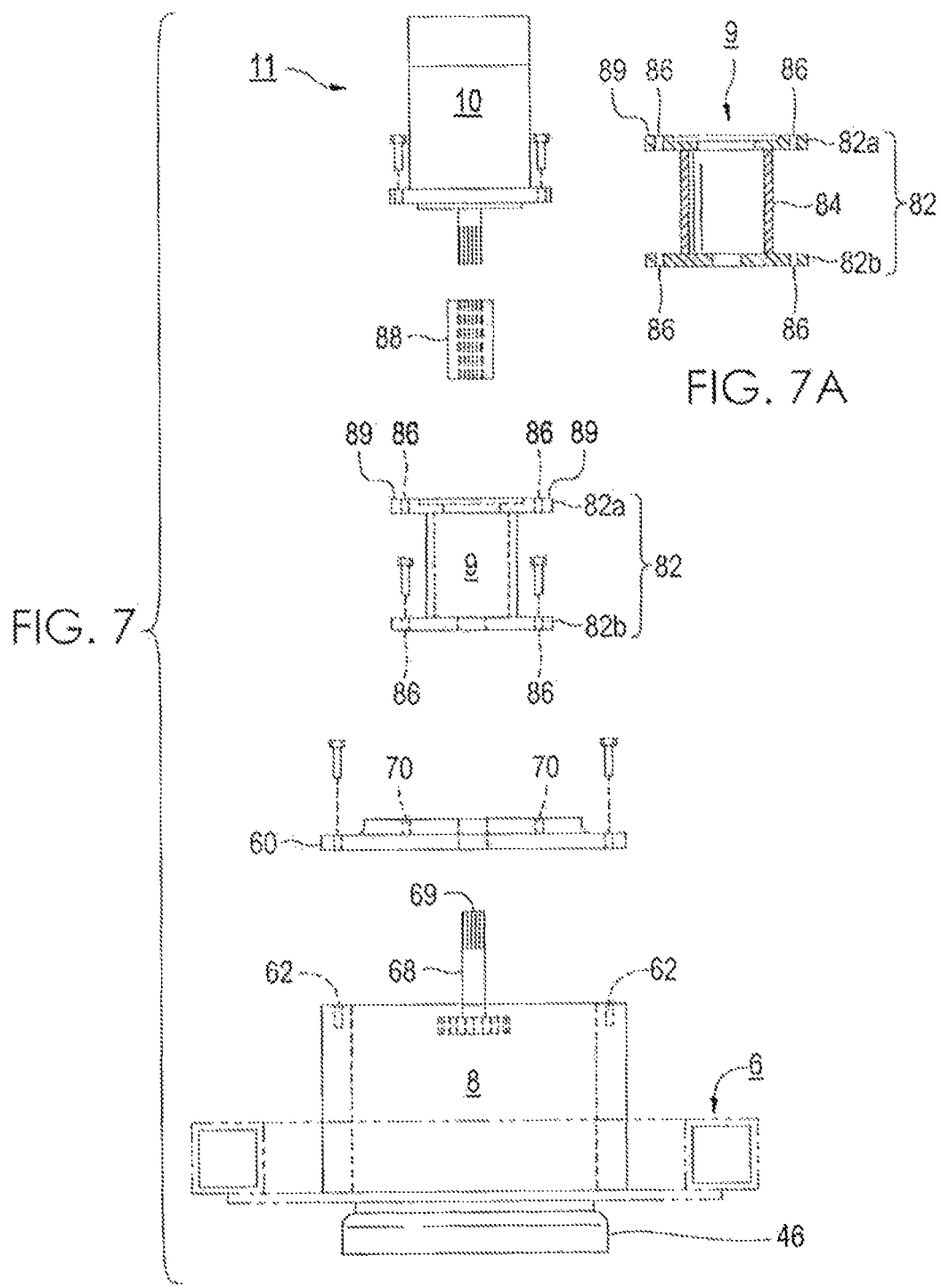
FIG. 7 shows an exploded view of one embodiment of the final drive system 11.
Figure 8:
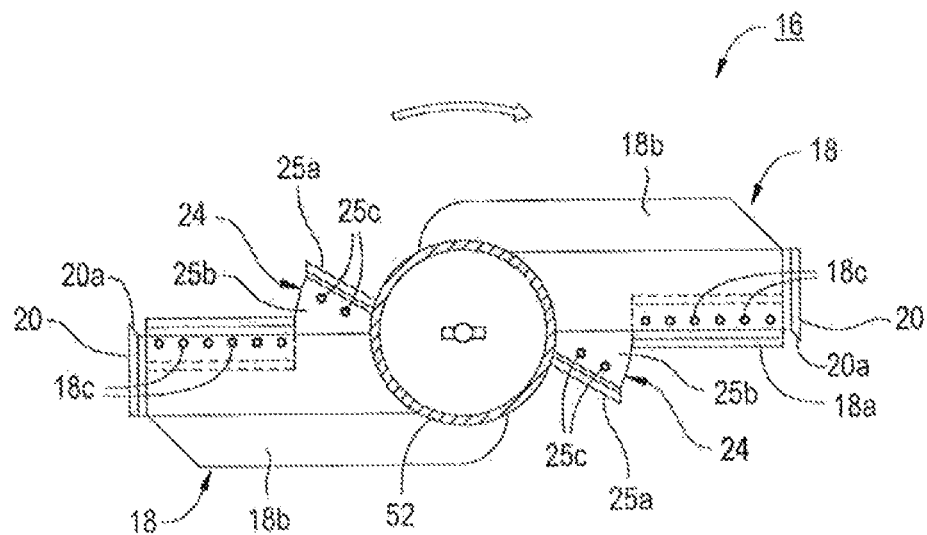
FIG. 8 shows a top view of one embodiment of the main bit assembly 16.
Figure 9:
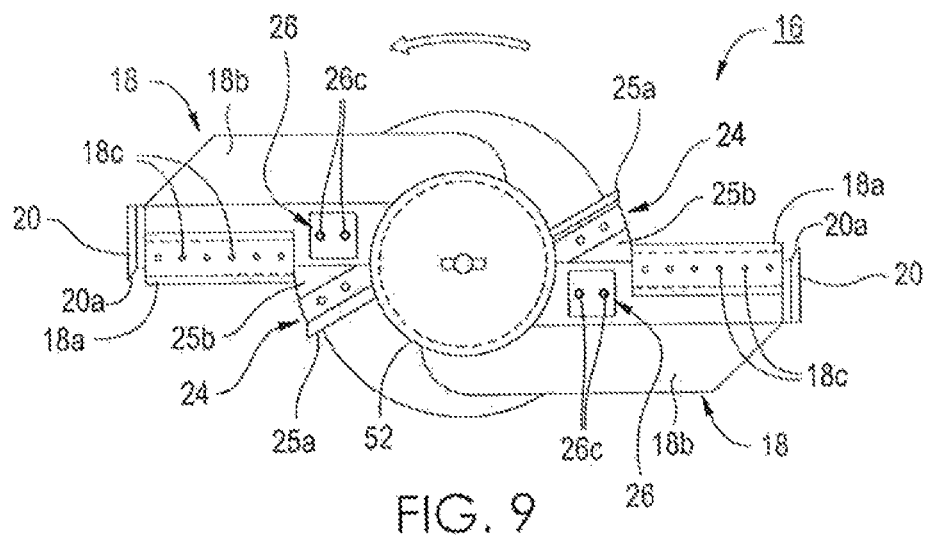
FIG. 9 shows a bottom view of one embodiment of the main bit assembly 16.

As shown in FIGS. 6 and 7, the stump destruction device 4 further comprises a motor 10. In one embodiment, the motor 10 is a hydraulic motor. A hydraulic motor 10 is a mechanical actuator that, converts hydraulic pressure and flow into torque and angular displacement (rotation). The hydraulic motor may be a "gear and vane" motor, an axial plunger motor, a radial piston motor or another other suitable design as would be known to one skilled in the art. In one embodiment, the hydraulic motor 10 is connected through a series of high-pressure hydraulic hoses to the self-propelled vehicle's 2 hydraulic system and/or pump which provide the high pressure hydraulic fluid to power the hydraulic motor 10.

In one embodiment, the hydraulic motor can rotate in both a forward (clockwise) and backward (counterclockwise) direction. The bi-directional hydraulic motor 10 provides many advantages in stump destruction as will be discussed in detail below. The motor 10 may be a variable speed motor or a single speed motor. In one embodiment, the hydraulic motor 10 is controlled by the self propelled vehicle's operator by a control means. In one embodiment, the control means may be a series of levers or joysticks controlling plurality valves that, depending upon if they are open or closed, engage the motor and control its directionality and speed.

In one preferred embodiment, the motor 10 may be a geared 160 cc (cubic centimeter) Rexroth motor allowing for adjustability in the speed, rotation and torque of the motor 10. In another embodiment, the 160 cc Rexroth motor is for example a model A6VM variable displacement motor available from Rexroth. In another alternate embodiment, the motor 10 is a 107 cc Rexroth motor. In an alternate embodiment, the motor 10 may be a motor from Sauer Danfross.

In one embodiment, the motor 10 is connected to the coupling 9, which in turn is connected to the gearbox 8. In this preferred embodiment, the motor 10, coupling 9 and gearbox 8 are in a vertical orientation and comprise the drive system 11 as in FIG. 7.

The motor 10 is capable of modulating the amount of force applied to the gearbox 8 in response to the amount of torque (or force) being encountered by the gearbox 8. This modulation is accomplished as discussed below. In one embodiment, the motor 10 may be an Rexroth model A6VM variable displacement motor described above and is coupled with a control mechanism. The control mechanism is capable of sensing the load (or torque) operating upon the motor 10 through the coupling 9 and gearbox 8. In one embodiment, the control mechanism may be the HA (or Automatic Control, High Pressure Related) control system sold in connection with the Rexroth A6VM 160 cc variable displacement motor or the Rexroth 107 cc motor and may be internal to the motor 10. In one embodiment, the HA control system is adapted to maintain the hydraulic pressure in the motor at approximately 4,000 psi. In an alternate embodiment, the HA control system may be adapted to maintain the hydraulic pressure in the motor at approximately 3,000 psi. In an alternate embodiment, the control mechanism is an HD1 control valve from Rexroth. The HD1 control mechanism allows the operator to modulate the output of the motor using various controls, including a pilot valve.

Gear Box

The stump destruction device 4 comprises a gear box 8 that is connected to the motor 10 and a gearbox output flange 46. The gear box 8 transfers the torque and angular displacement (rotation) produced by the motor 10 to the bit assembly 12 through the gearbox output flange 46. The gearbox 8 may comprise many different gear ratios depending upon the stump to be removed and the self-propelled vehicle 2. In one embodiment, the gear box 8 may comprises a gear ratio of between 40:1 and 78:1. In one embodiment, the gearbox 8 is a variable speed gear box. In an alternate embodiment the gearbox 8 is a variable ratio gearbox 8 capable of producing a gear ratio range 40:1 to 155:1.

In one preferred embodiment, the gearbox 8 comprises a "final drive" from a large piece of industrial equipment such as an excavator. In one embodiment, as shown in FIG. 7, the gearbox 8 is the final drive from a Caterpillar 330C excavator. In one embodiment, the gear box 8 from the excavator is modified as discussed herein. In an alternate embodiment, the gearbox 8 comprises a final drive from a Hydro-Ax 321 feller buncher.

In one embodiment, the final drive is modified by removing the sprocket that normally contacts the tracks of the excavator. The sprocket is typically attached to the final drive by a series of bolts that may be removed in a manner as would be known to one of ordinary skill in the art. Opposite the sprocket, the final drive also typically contains a motor (often hydraulic) that provides the force (or torque) to the final drive that is used to turn the sprocket and eventually the tracks. In one embodiment, the motor is also removed from the final drive. Those of ordinary skill in the art will understand and appreciate how to remove the motor from the final drive.

In one embodiment, as shown in FIG. 7, a cover plate 60 has been added to the final drive to replace the cavity created by removing the motor. This cover plate 60 is located opposite the attachment point of the sprocket (which has been removed as described above). In one embodiment the cover plate 60 is attached to the final drive through the bolt holes on the final drive housing 62 through which the motor was attached. After the addition of the cover plate 60, the final drive is rotated into a vertical position rather than the customer horizontal position.

After being rotated into a vertical position, several other modifications are made to the final drive. First, the housing 64 located behind the sprocket (which has been removed as described above) is removed by removing the retaining bolts. Next, the housing 64 is modified by drilling a hole 66 (or opening) in the center of the housing 64. In one embodiment, the hole may be approximately 2.25 inches in diameter. This hole 66 allows a drive shaft 68 to pass through the housing 64. In one embodiment, the drive shaft 68 is the original drive shaft 68 contained in the final drive that has been removed and rotated 180 degrees. The drive shaft 68 may be in contact with an internal spline coupling 88 in the final assembly. Additionally, the housing 64 is also machined so that it has a flat, rather than a convex surface. Finally, a plurality of bolt holes 70 are added to the housing 64 which may later be used to attach to the coupling 9.

The coupling 9 is shown in FIG. 7A. The coupling 9 is positioned between the gearbox 8 and the motor 10. In one embodiment, the coupling 9 comprises a plurality of plates 82a, 82b and a shaft 84. In one embodiment, the shaft 84 may be a pipe that is approximately 4.00 inches in diameter. In one embodiment, the plates 82 are not identical in that the plate 82a comprises a series of bolt holes 86 and an outer flange 89 that allow the coupling to be attached to the motor 10. In the same embodiment, the 82b is a straight (or flat) plate comprising a series of bolt holes 86 for attachment to the gearbox 8. In one embodiment, the plates 82a, 82b may comprise 0.75 inch thick steel.

To construct the drive system 11, the gear box 8 is attached to the coupling 9 via the bolt holes 86 in the plate 82b and the bolt holes 70 added to the housing 64 on the gear box 8 as shown in FIGS. 7 and 7A. As constructed, the drive shaft 68 now passes through the housing 64 and into the coupling 9. Additionally, an internal spline coupling 88 is attached to the distal end 69 of the drive shaft 68. This internal spline coupling 88 will be attached to the output shaft of the motor 10.

Bit Assembly

The stump destruction device 2 further comprises a bit assembly 12. In one embodiment the bit assembly 12 comprises an upper bit assembly 14, a main bit assembly 16 and a guide bit assembly 22.

In one embodiment, the upper bit assembly 14 comprises a shaft 14c attached to both the gearbox output flange 46 and the main bit assembly 16 and serves to connect the gearbox 8 to the main bit assembly 16. The connection to the gearbox output flange 46 and the main bit assembly 16 may be made through one or more flanges (14a, 14b) on the upper bit assembly 14. The upper bit assembly 14 may be attached to the gearbox output flange 46 by any means known in the art. In one embodiment, the upper bit assembly 14 may be welded to the gearbox output flange 46 thereby permanently connecting the two. In one embodiment, the upper bit assembly 14 is removably attached to the gearbox output flange 46 through one or more bolts 48. Likewise, the upper bit assembly 14 may be attached to the main bit assembly 16 through any means known in the art, including welding or with one or more bolts 48. In the proceeding preferred embodiment, if the upper bit assembly 14, the gearbox output flange 46 or the main bit assembly 16 is damaged during operation, either piece may be removed for repair or replacement. In one embodiment, the upper bit assembly 14 may comprise a length of eight (8) (e.g., 20.3 cm) internal diameter metal tubing.

The main bit assembly 16 comprises one or more cutting blades and a shaft 52. The shaft 52 is connected to the upper bit assembly 14 at the shaft's 52 upper portion 53 and to the guide bit assembly 22 at the shaft's 52 lower portion 54. In one preferred embodiment, the upper bit assembly 14 and the shaft 52 are connected using one or more bolts 48, although other methods of attachment are considered within the scope of this disclosure. In one embodiment, the shaft 52 is wider at its upper portion 53 than its lower portion 54. Put another way, the shaft 52 may be tapered from the upper portion 53 which is connected to the upper bit assembly 14 to the lower portion 54 connected to the guide bit assembly 22. In one embodiment, the taper of the shaft 52 begins at point P as shown in FIGS. 6 and 9A-9D.

In one embodiment, the main bit assembly 16 comprises one or more lower cutting blades 24. In one embodiment, the main bit assembly 16 comprises one (1) or two (2) lower cutting blades 24. The lower cutting blades 24 are attached to the shaft 52 at a point below the attachment point of the upper cutting blades 18. As shown in FIGS. 4-8, in one embodiment, the lower cutting blades 24 comprise both a cutting edge 25a and a main body 25b. The cutting edges 25a are adapted to engage or "bite into" the stump to be destroyed. In one preferred embodiment, the cutting edge 25s widens the cavity in the stump formed by the guide bit assembly 22 (as described below). In one embodiment, the cutting edges 25a may be replaceable in that when one cutting edge 25a becomes damaged or loses its "edge" it may be easily replaced. In one embodiment, the cutting edges 25a are bolted onto the main body 25b through a series of bolts 25c, although other means of fastening the cutting edge 25a to the main body 25b, such as welding, should be considered within the scope of this disclosure. In one preferred embodiment, the bolts 48 are counter-sunk into the main body 25b to avoid wear on the bolt heads during use. In one embodiment, the main body 25b of the lower cutting blades 24 contacts and is attached to both the bolt shaft 52 and the main body 25b of the upper cutting blades, described below. In other embodiments, the main body 25b may only contact the shaft 52.

Figure 11:
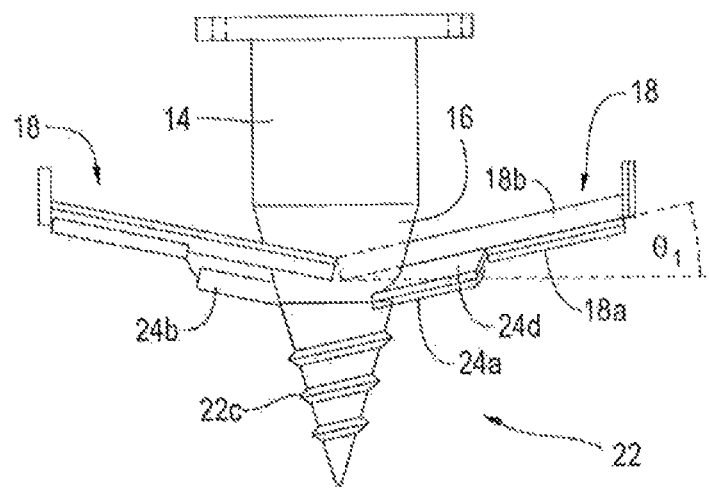
FIGS. 11 and 12 show side views of one embodiment of the main bit assembly 16 and the guide bit assembly 22.
Figure 12:
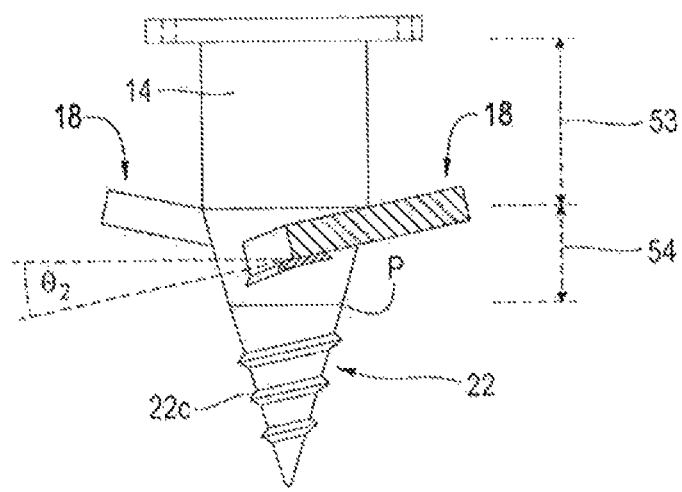
Figure 13:
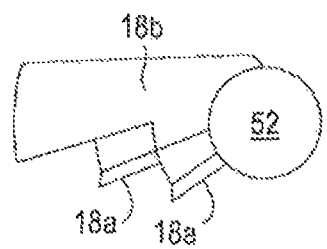
Figure 14:
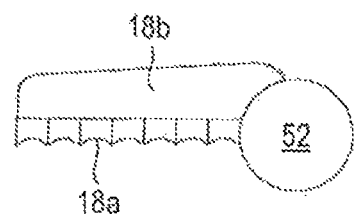
Figure 15:
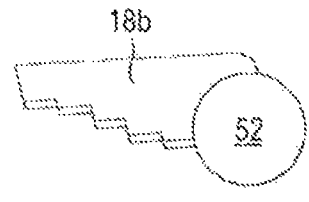
Figure 16:
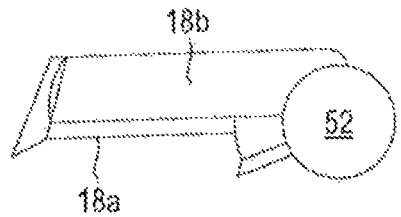
Figure 17:
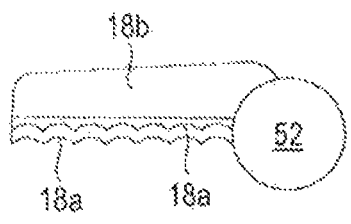
Figure 18:
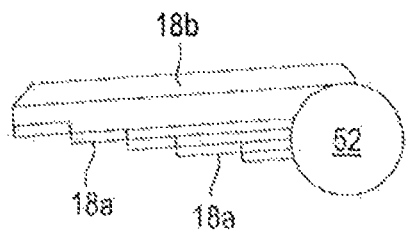
Figure 19:
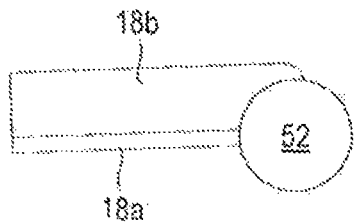
Figure 20:

In one embodiment as shown in FIGS. 11 and 12, the lower cutting blades 24 have both an angle and a pitch to them to facilitate the destruction of the stump. In one embodiment, the angle is a certain angle, $\theta_1$, above a horizontal axis extending from the attachment point of the lower cutting blade 24 to the shaft 52. In one embodiment, $\theta_1$ is about 12 degrees. In an alternate embodiment, the lower cutting blades 24 also comprise a pitch of angle $\theta_2$. In one embodiment, $\theta_2$ is about 12 degrees.

In one embodiment, the cutting edges 25a comprise the same material as the main bodies 25b. In alternate embodiments the cutting edges comprise a different mater than the main bodies 25b. In one embodiment, the cutting edges 25a comprise T1 hardened steel, AR400 steel or AR500 steel.

In one embodiment, the main bit assembly 16 also comprises one or more upper cutting blade 18. The upper cutting blades 18 comprise, in one embodiment, one or more cutting edges 18a and one or more main bodies 18b. In one embodiment, the cutting edges 18a may be replaceable in that when one cutting edge 18a becomes damaged or loses its "edge" it may be easily replaced. In one embodiment, the cutting edges 18a are bolted onto the main body 18b through a series of bolts 18c.

In one embodiment, the cutting edges 18a comprise the same material as the main bodies 18b while in alternate embodiments the cutting edges 18a comprise a different mater than the main bodies 18b. In one embodiment, the cutting edges 18a T1 hardened steel, AR400 steel or AR500 steel.

As shown in FIGS. 8-22, in one preferred embodiment, the upper cutting blades 18 further comprise one or more depth cutting guides 26. In one embodiment, the depth cutting guides 26 function to break up the wood debris and dirt into smaller pieces after it has been loosened or removed by the upper cutting blades 18. It is possible that large pieces of dirt or wood debris could be generated by the upper cutting blades 18 alone. Such large debris is undesirable in situations where the land may be converted to agricultural use as it may damage field instruments such as disk harrows or plows. The depth cutting guides 26 comprise, in one embodiment, a shim 26a and a main body 26b. The shim 26a comprises, in one embodiment, a "U" shaped metal member (though other materials suitable to the purpose should also be considered in the scope of this disclosure) which fits into a space between the main body 26b of the depth cutting guide 26 and the main body 18b of the upper cutting blade. The shim 26a by being installed between depth cutting guide 26 and main body 18b increases the thickness of the depth cutting guide and decreases the amount of the cutting of the blade. This controls the depth of the cut for different type materials and applications. In one embodiment, the depth cutting guide 26 is attached to the upper cutting blade 18 by one or more retaining bolts 26c, which may be countersunk.

Figure 26:
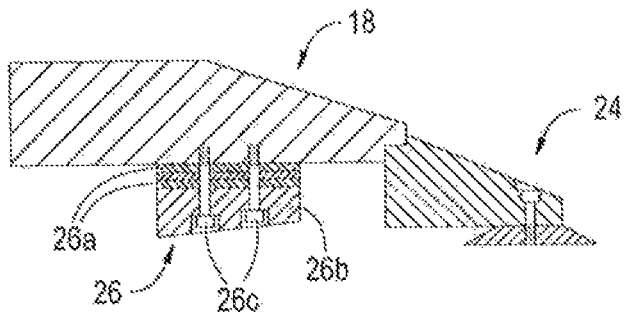
FIG. 26 shows a side view of one embodiment of a depth cutting guide 26 attached to an upper cutting arm 18.
Figure 26A:
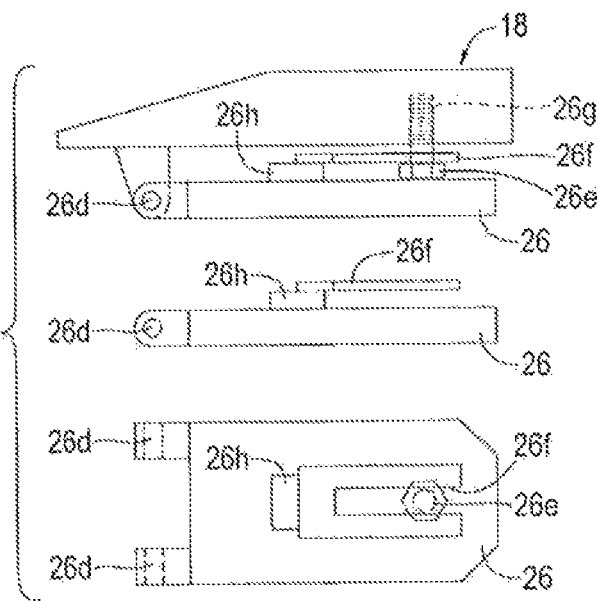
Figure 26B:
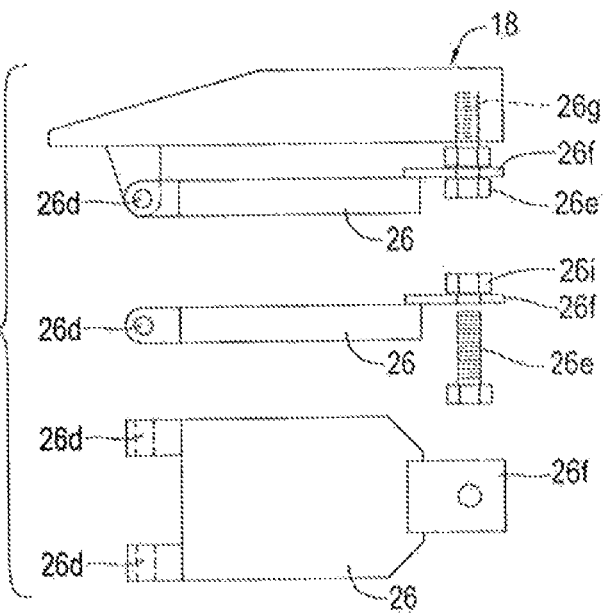
Figure 27:
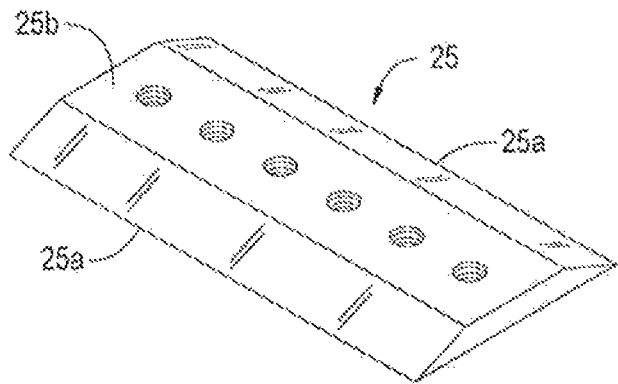
Figure 28:
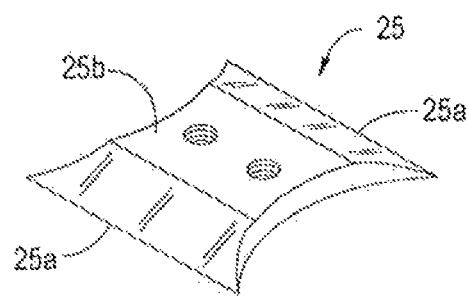

In an alternate embodiment shown in FIGS. 26A and 26B, the depth cutting guide 26 is attached to the upper cutting blades 18 via a hinge connection 26d. In one embodiment, the depth cutting guide 26 is also attached to the upper cutting blade 18 via a bolt 26e which is threaded into a slot in the upper cutting blade 26g. In one embodiment, the bolt 26e is engaged by a retaining slot 26f. Various embodiments of the depth cutting guide 26 are shown in FIGS. 26A and 26B.

Figure 24:
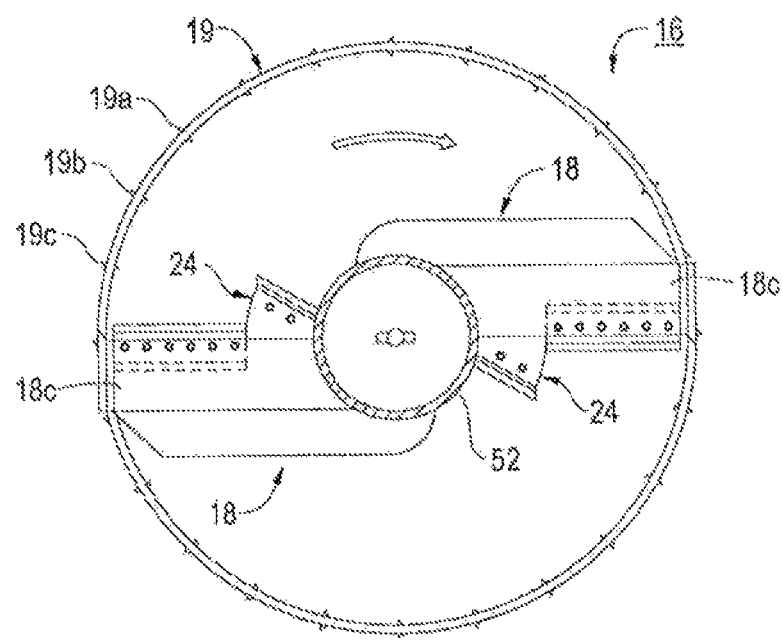
FIG. 24 shows a top view of an alternate embodiment of the main bit assembly 16 comprising an outer ring 19.
Figure 25:
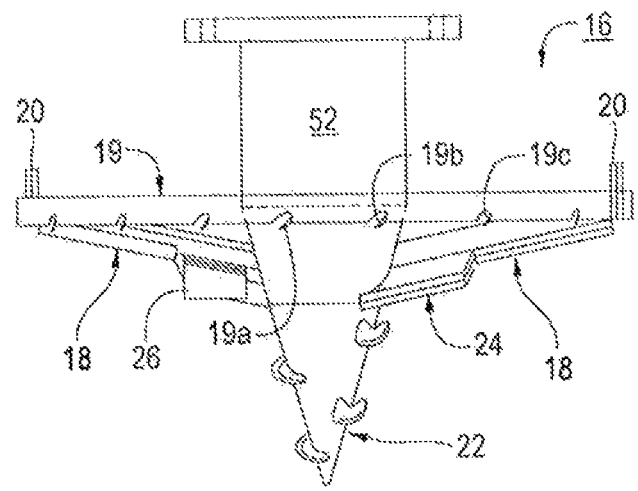
FIG. 25 shows a side view of an alternate embodiment of the main bit assembly 16 comprising an outer ring 19.

In an alternate embodiment, the upper cutting blades 18 further comprise an outer ring 19 which is attached to the distal end 18c of the upper cutting blades, as shown in FIGS. 24-25. The ring 19 may further comprise one or more teeth 19a, 19b, 19c on its bottom edge. In one embodiment, the teeth 19a, 19b and 19c are wider than the ring 19.

In one embodiment as shown in FIGS. 11 and 12, the upper cutting blades 18 have both an angle and a pitch to them to facilitate the destruction of the stump. In one embodiment, the angle $\theta_1$ is between 8 and 20 degrees. In an alternate embodiment, the upper cutting blades 18 also comprise a pitch of angle $\theta_2$. In one embodiment, $\theta_2$ is between 8 and 20 degrees.

In one embodiment shown in FIGS. 11 and 12, the main bit assembly 16 further comprises one or more lateral cutting blades 20. The lateral cutting blade 20 comprise, in one embodiment, one or more cutting edges 20a and one or more main bodies 20b. In one embodiment, the cutting edges 20 may be replaceable in that when one cutting edge 20a becomes damaged or loses its "edge" it may be easily replaced. In one embodiment, the cutting edges 20a are bolted onto the main body 20 through a series of bolts 20.

The lateral cutting blades 20 attach to the distal end 18c of the upper cutting blades 18 relative the shaft 52. In one preferred embodiment, the lateral cutting blades 20 contact the upper cutting blades 18 at approximately a 90 degree angle. In one embodiment, the lateral cutting blade 20 may be welded to the upper cutting blade 18. In an alternate embodiment, the lateral cutting blade 20 is attached to the upper cutting blade through one or more bolts.

The cutting edges 18a, 20a and 25a may comprise many different configurations. As shown in FIGS. 8-9, 12-19, 24, 25 and 27, in one embodiment the cutting edge 18a, 20a and 25a may be double sided in that they comprise edges on opposite sides thereof. In this embodiment, the double sided cutting edge offers the operator the ability to simply rotate the cutting edge 18a, 20a and 25a should one side become dull or be damaged during operation. In alternate embodiments, the cutting edge 18a, 20a and 25a may be serrated. In an alternate embodiment, the cutting edge 18a, 20a and 25a may comprise a smooth edge or a series of step-like smooth cutting edge. In yet an alternate embodiment, the cutting edge 18a, 25a may comprise several layered surfaces each comprising a surface capable of cutting into the object stump.

Figure 10A:
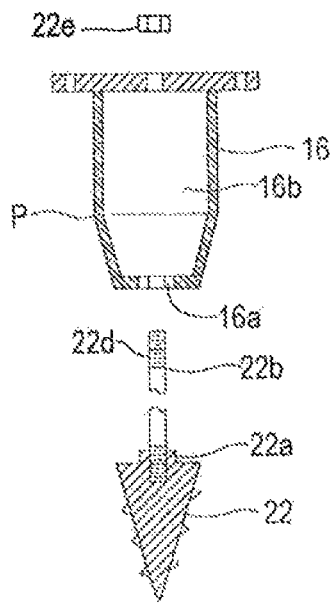
FIGS. 10A-10H show side views of alternate embodiments of the guide bit assembly 22 and the main bit assembly 16.
Figure 10C:
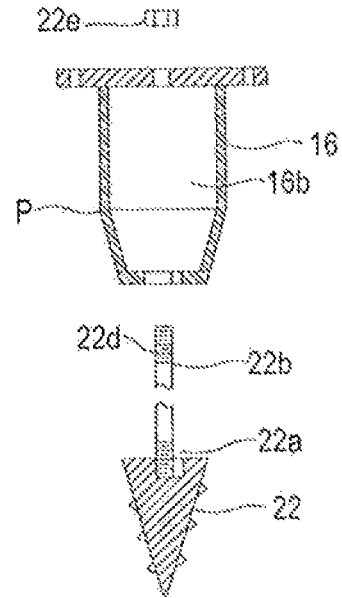
Figure 10B:
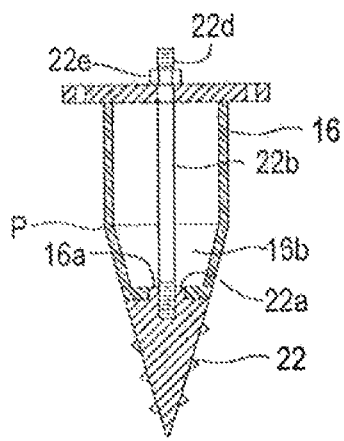
Figure 10D:
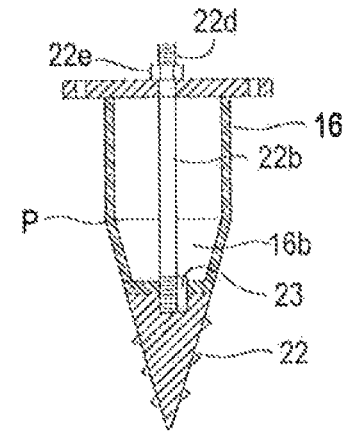
Figure 10E:
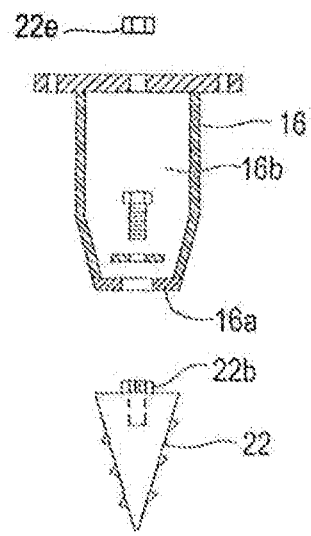
Figure 10G:
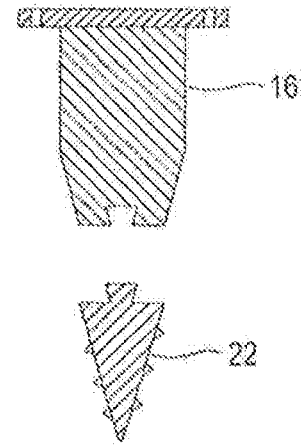
Figure 10F:
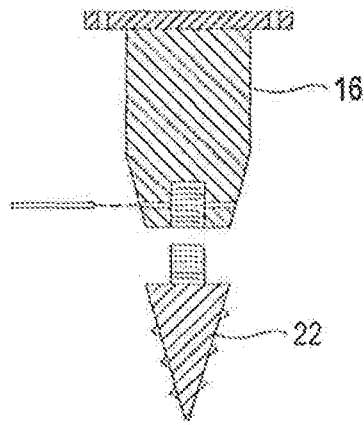
Figure 10H:
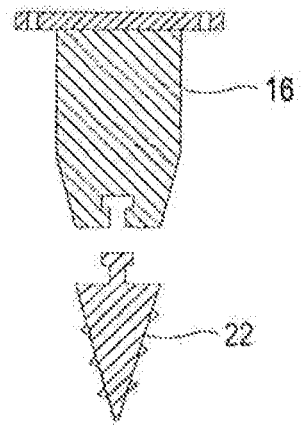

The bit assembly 12 further comprises a guide bit assembly 22 located below the main bit assembly 16. As shown in FIGS. 10A-10H. In one embodiment, the guide bit assembly comprises a male portion 22a, a connecting rod 22b and a cutting element 22c. In one embodiment, the male portion 22a is adapted to engage the female portion 16a of the main bit assembly 16. Further, in the proceeding embodiment, the connecting rod 22b extends in a direction opposite the cutting element 22c and into the bore cavity 16b of the main bit assembly 16. In one preferred embodiment, the connecting rod 22b is of sufficient length to pass through the entire, length of the bore cavity 16b in the main bit assembly and further comprises threads 22d its distal end. In an alternate embodiment, the connecting rod 22b does not extend through the entire length of the guide bit assembly 22. A nut 22e then may be used to secure the guide bit assembly 22 to the main bit assembly 16. In one embodiment, the guide bit assembly 22 further comprises a key 23 mechanism to further secure it to the main bit assembly. In one embodiment, the key assembly includes a male portion 23a adapted to engage a second female portion 23b on the interior of female portion 16a of the main bit assembly 16. In some embodiments, the connecting rod 22b extends part way into the bore cavity 16b and is secured by placing a washer and threaded nut onto the threaded connecting rod 22b. In other embodiments, the threaded connecting rod 22b is threaded (or screwed) into the main bit assembly, as shown in FIG. 10F. As shown in FIGS. 10G-10H, in some embodiments the guide bit assembly 22 attaches to the main bit assembly 16 using either a dovetail configuration or a "t-lock" configuration. In each of the embodiments shown in FIGS. 10F-10H, the guide bit assembly 22 is secured to the main bit assembly 16 via a retaining bolt or pin.

The guide bit assembly 22 comprises a cutting element 22c. In one embodiment, the cutting elements may be comprised of a plurality of cutting knives similar to the cutting edges 18a located on the upper cutting blades 18 and the cutting edges 25a located on the lower cutting blades. In one embodiment, the cutting knives 22d are regularly spaced around the outside surface of the guide bit assembly 22. In an alternate embodiment, the cutting knives 22d are irregularly spaced about the outside surface of the guide bit assembly. In other embodiments, the cutting element 22c comprises a helical cutting element as shown in FIGS. 10-11.

INDUSTRIAL APPLICABILITY

One embodiment of using the stump destruction is described herein. After selecting a stump to be removed/destroyed, the operator may position the stump destruction device 4 over the stump using the self-propelled vehicle's 2 upper and lower attachment supports 42, 44 and the hydraulic cylinders connected thereto. After positioning the guide bit assembly 22 into proximate contact with the stump, the operator will engage the hydraulic motor 10 and contact the stump 8 with the guide bit assembly 22.

The guide bit assembly may serve as to create a pilot hole in the stump thus ensuring that the upper and lower cutting blades 18, 24 contact the stump properly.

As the guide bit assembly 22 "bites" into the stump, the lower cutting blades 24 will contact the stump and create a larger hole or void in the stump. The upper cutting blades 18 then contact the stump essentially removing/destroying the majority of the stump material. Finally, the lateral cutting blades 20 function to sever any roots radiating outward from the stump.

Figure 29:
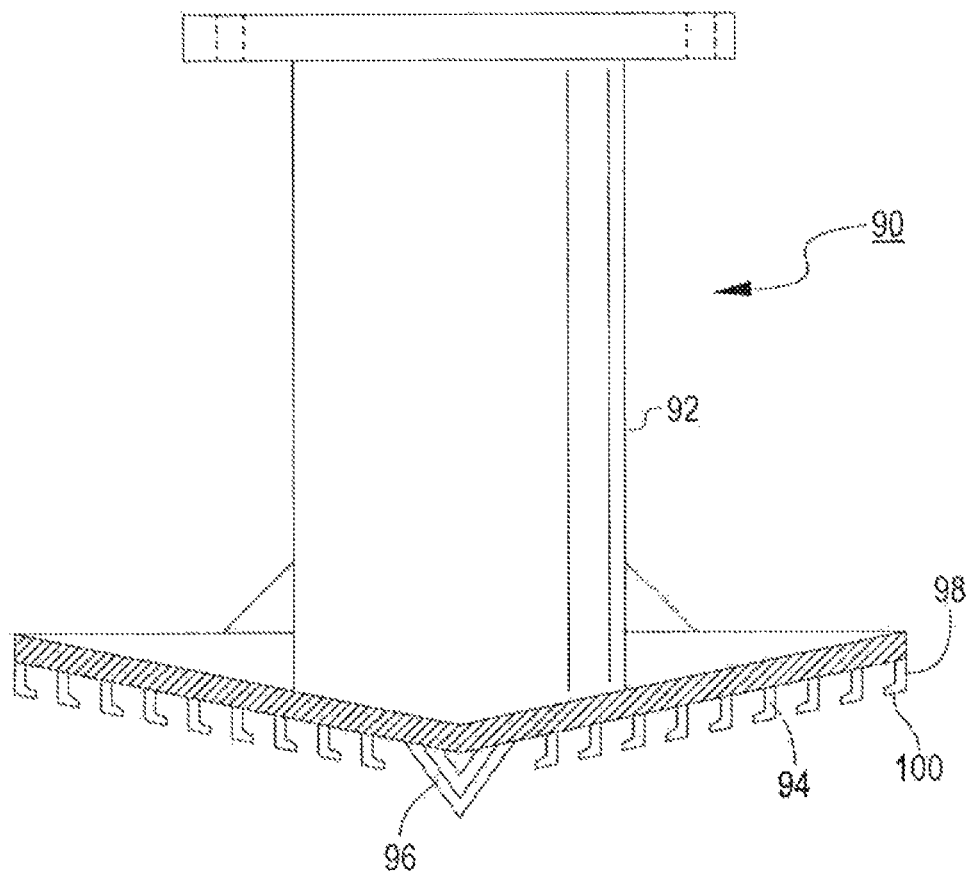
FIG. 29 shows one embodiment of an asphalt grinder attachment which may be attached to the final drive 11.

In additional to the stump destruction bit assembly 12 described above, several other attachments (or "heads") may be attached to the drive system 11 to impart additional functionality. In one embodiment, an asphalt (or pavement) grinder 90 (shown in FIG. 29) may be attached to the drive system 11. The asphalt grinder 90 may comprise a grinder shaft 92, one or more teeth 94 and a drilling means 96. In one embodiment, the teeth 94 comprise a first 98 and a second 100 tooth element. The teeth 94 and drilling means 96 may be made from any-suitable material. In other embodiments a log splitter may be attached to the drive system 11.

The stump destruction apparatus 4 of the present disclosure is safer than those known in the prior art as it operates at a lower rotation-per-minute (RPM) than previous devices for the removal of stumps, thus the likelihood of debris being generated and thrown by the apparatus is lessened. Also, the stump destruction apparatus is operated from the safety of the cab of she self-propelled vehicle minimizing the operator's exposure to any flying debris generated during operation. Finally, the stamp destruction device is environmentally friendly as the stump is tendered to small chips that are biodegradable. The drive system 11 addresses many shortcomings of the prior art in that it has the ability to increase or decrease torque output of the motor 10 in relationship to the load on the bit assembly 12 or ether suitable attachments.

One novel aspect of the present disclosure is the reversibility of the motor 10 and the hit assembly 12. If the bit assembly becomes fouled, it is advantageous to be able to reverse the directionality of rotation of the bit assembly 12 to unfoul the device. Further, the motor 10 may offer one or more speeds of operation thus allowing the operator greater freedom to tailor the operation of the device to the job at hand.

We claim:

1. An apparatus comprising:
 a. a frame supporting a motor and a gearbox, wherein the motor is operatively coupled to the gearbox via a coupling; and
 b. a bit assembly, the bit assembly comprising:
  i. a shaft, having a first end and a second end, wherein the first end is attached to the gearbox via a gearbox output flange,
  ii. a main bit assembly further comprising an upper cutting blade and a lower cutting blade attached to the shaft, wherein the lower cutting blade is located closer to the second end of the shaft than the upper cutting blade,
  iii. an adjustable depth cutting guide attached to a bottom portion of the upper cutting blade, wherein the adjustable depth cutting guide is hingedly attached to the bottom portion of the upper cutting blade,
  iv. a lateral cutting blade attached at the far end of the upper cutting blade, and
  v. a guide bit assembly;
 wherein the apparatus is attachable to a self-propelled vehicle.

2. The apparatus of claim 1, wherein the frame further comprises
 a. a vertical support member,
 b. a horizontal support member,
 c. a bracing member, and
 d. an attachment mount, that is adapted to allow the connection of the apparatus to the self-propelled vehicle.

3. The apparatus of claim 1, wherein the motor comprises a hydraulic motor, wherein the motor is attached to a source of hydraulic pressure.

4. The apparatus of claim 3, wherein the guide bit assembly is reversibly attached to the main bit assembly.

5. The apparatus of claim 3, wherein the motor further comprises a control mechanism that modulates the amount of torque applied by the motor to the gearbox.

6. The apparatus of claim 1, wherein the gearbox is a variable speed gearbox.

7. The apparatus of claim 1, wherein the upper cutting blade further comprises a replaceable cutting edge.

8. The apparatus of claim 1, wherein the lower cutting blade further comprises a replaceable cutting edge.

9. The apparatus of claim 1, further comprising a shim that is inserted between the adjustable depth cutting guide and the bottom portion of the upper cutting blade.

* * * * *